US012566662B2

(12) United States Patent
Jeong et al.

(10) Patent No.: US 12,566,662 B2
(45) Date of Patent: Mar. 3, 2026

(54) METHOD AND COMPUTING DEVICE FOR RESPONDING TO MEMORY FAIL

(71) Applicant: Samsung Electronics Co., Ltd., Suwon-si (KR)

(72) Inventors: Jong Won Jeong, Suwon-si (KR); Sung-Joon Kim, Suwon-si (KR); Il Ho Kim, Suwon-si (KR); Won Jae Shin, Suwon-si (KR); Ho-Young Lee, Suwon-si (KR); Jin Hun Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 50 days.

(21) Appl. No.: 18/773,714

(22) Filed: Jul. 16, 2024

(65) Prior Publication Data

US 2025/0190298 A1     Jun. 12, 2025

(30) Foreign Application Priority Data

Dec. 7, 2023     (KR) ........................ 10-2023-0176694

(51) Int. Cl.
 G06F 11/00     (2006.01)
 G06F 11/07     (2006.01)
 G06F 11/22     (2006.01)

(52) U.S. Cl.
 CPC ........ G06F 11/0793 (2013.01); G06F 11/073 (2013.01); G06F 11/2284 (2013.01)

(58) Field of Classification Search
 CPC . G06F 11/0793; G06F 11/073; G06F 11/2284
 See application file for complete search history.

(56) References Cited

U.S. PATENT DOCUMENTS

| | | | | |
|---|---|---|---|---|
| 8,028,207 | B1 | 9/2011 | Villela et al. | |
| 8,516,298 | B2 | 8/2013 | Lu et al. | |
| 11,269,729 | B1 * | 3/2022 | Bulusu | G06F 11/0778 |
| 11,573,905 | B2 * | 2/2023 | Stumpf | G06F 11/1441 |
| 2021/0389956 | A1 * | 12/2021 | Li | G06F 11/2056 |
| 2021/0406143 | A1 * | 12/2021 | Chaiken | G06F 11/1048 |
| 2022/0050603 | A1 | 2/2022 | Zhou et al. | |
| 2023/0185659 | A1 | 6/2023 | Bao et al. | |

FOREIGN PATENT DOCUMENTS

| | | |
|---|---|---|
| CN | 115629905 A | 1/2023 |
| CN | 116302641 A | 6/2023 |

* cited by examiner

*Primary Examiner* — Jason B Bryan
(74) *Attorney, Agent, or Firm* — Muir Patent Law, PLLC

(57) ABSTRACT

A method of operating a computing device includes performing a pre-boot memory test on a memory by a BIOS (Basic Input/Output System), recording, in a log, memory fail information generated as a result of performing the pre-boot memory test by the BIOS, and performing a page offline operation using the memory fail information, after an operating system (OS) of the computing device is installed.

20 Claims, 9 Drawing Sheets

10

| What: | /sys/devices/system/memory/soft_offline_page |
|---|---|
| Date: | Sep 2009 |
| KernelVersion: | 2.6.33 |
| Contact: | ABC@ABC.ORG |
| Description: | |

Soft-offline the memory page containing the physical address written into this file. Input is a hex number specifying the physical address of the page. The kernel will then attempt to soft-offline it, by moving the contents elsewhere or dropping it if possible. The kernel will then be placed on the bad page list and never be reused.

The offlining is done in kernel specific granuality. Normally it's the base page size of the kernel, but this might change.

The page must be still accessible, not poisoned. The kernel will never kill anything for this, but rather fail the offline. Return value is the size of the number, or a error when the offlining failed. Reading the file is not allowed.

11

| What: | /sys/devices/system/memory/hard_offline_page |
|---|---|
| Date: | Sep 2009 |
| KernelVersion: | 2.6.33 |
| Contact: | ABC@ABC.ORG |
| Description: | |

Hard-offline the memory page containing the physical address written into this file. Input is a hex number specifying the physical address of the page. The kernel will then attempt to hard-offline the page, by trying to drop the page or killing any owner or triggering IO errors if needed.  Note this may kill any processes owning the page. The kernel will avoid to access this page assuming it's poisoned by the hardware.

The offlining is done in kernel specific granuality. Normally it's the base page size of the kernel, but this might change.

Return value is the size of the number, or a error when the offlining failed.
Reading the file is not allowed.

```
///
/// Type 4 = Enhanced type for DRAM Advanced Memtest errors
///
typedef struct{
    EWL_ENTRY_HEADER              Header;
    EWL_ENTRY_CONTEXT             Context;
    EWL_ENTRY_MEMORY_LOCATION  MemoryLocation;
    ADV_MT_TYPE                   MemtextType;
    CPGC_ERROR_STATUS_MATS       AdvMemtestErrorInfo; // Review
definition on Table 2-1
    UINT32                        Count;

UNIT64                        PhysicalAddr_MemoryFail;

BOOL                          PAGE_OFFLINE_CHECK_FLAG;

} EWL_ENTRY_TYPE4;
```
13

14

```
///
/// Type 5 = Legacy Memtest accumulated DQ errors
///
typedef struct{
    EWL_ENTRY_HEADER              Header;
    EWL_ENTRY_CONTEXT             Context;
    EWL_ENTRY_MEMORY_LOCATION  MemoryLocation;
    UNIT8                         SubRank;
    UNIT8                         BankAddress;
    UINT8                         DqBytes[9];  /// Byte 0 = DQ[7:0]
,byte 1 = DO[15:8], etc.

UNIT64                        PhysicalAddr_MemoryFail;

BOOL                          PAGE_OFFLINE_CHECK_FLAG;

} EWL_ENTRY_TYPE5;
```
15

Fig. 4

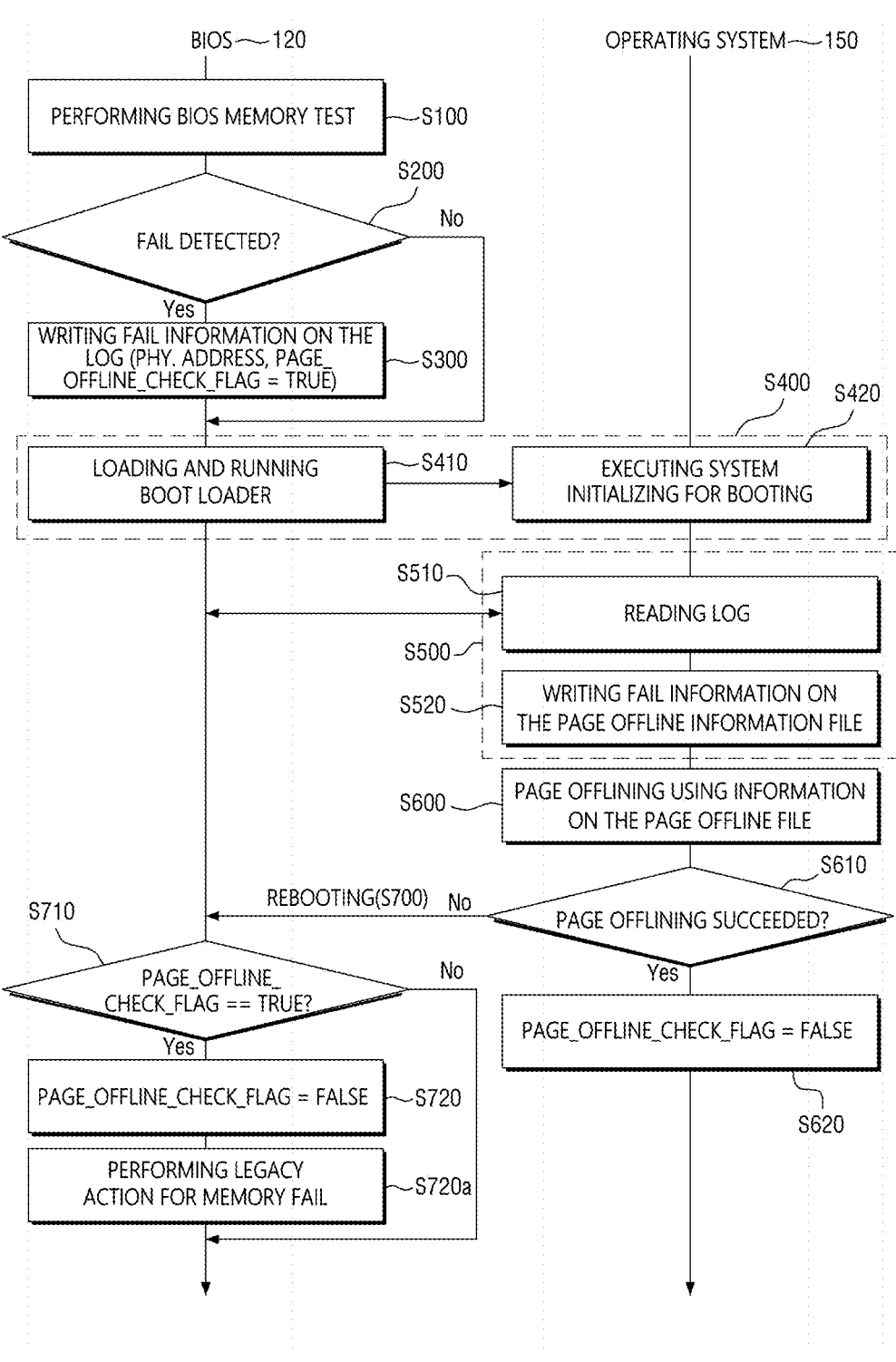

BIOS——120

OPERATING SYSTEM——150

PERFORMING BIOS MEMORY TEST ——S100

S200

FAIL DETECTED?          No

Yes

WRITING FAIL INFORMATION ON THE LOG (PHY. ADDRESS, PAGE_ OFFLINE_CHECK_FLAG = TRUE) ——S300

S400    S420

LOADING AND RUNNING BOOT LOADER ——S410

EXECUTING SYSTEM INITIALIZING FOR BOOTING

S510

READING LOG

S500

WRITING FAIL INFORMATION ON THE PAGE OFFLINE INFORMATION FILE
S520

PAGE OFFLINING USING INFORMATION ON THE PAGE OFFLINE FILE
S600

S610

REBOOTING(S700)  No          PAGE OFFLINING SUCCEEDED?

S710

PAGE_OFFLINE_ CHECK_FLAG == TRUE?          No          Yes

PAGE_OFFLINE_CHECK_FLAG = FALSE

Yes

PAGE_OFFLINE_CHECK_FLAG = FALSE ——S720

S620

PERFORMING LEGACY ACTION FOR MEMORY FAIL ——S720a

Fig. 7

METHOD AND COMPUTING DEVICE FOR RESPONDING TO MEMORY FAIL

BACKGROUND

1. Field of the Invention

The present disclosure relates to a method for responding to a memory fail and a computing device to which the method is applied.

2. Description of the Related Art

A BIOS (Basic Input/Output System) performs a test on hardware components of a computing device after the computing device is powered on. For example, a BIOS test may be performed on a memory module. If a memory fail is detected as a result of performing such a test, a responding action is performed accordingly.

The responding action may include booting interruption, mapping-out of a channel in which a memory fail has occurred, a PPR (Post Package Repair) or the like. The booting interruption may prevent an administrator from taking any responding actions other than a power shut-off or a front inspection. The mapping-out of a channel with a memory error may prevent all memory modules connected to the channel from being used even when a failure occurs in only a partial region of the memory module. The mapping-out of the channel may deactivate a channel to the memory module, thereby reducing the bandwidth of the overall memory IN/OUT. The PPR has limited availability due to the limitations supported by the processor.

On the other hand, at an operating system (OS) level, a page offline technique is provided which isolates a memory region in which a failure has occurred so that it is not used on a page-by-page basis. Such a page offline technique prevents the page (frame) of the memory region in which the memory fail has occurred from being mapped to a page utilized by the process, thereby preventing the memory region in which the memory fail has occurred from being actually utilized. Since such a page offline technique excludes only the failure occurrence region grasped by the operating system from use, there is an advantage that the utilization of memory resources may be maximized in comparison with the booting interruption, mapping-out of a channel, and PPR techniques as mentioned above.

Since the above-mentioned page offline technique is provided by the operating system, it is a technique that cannot be utilized before booting is completed. That is, if actions related to memory fail fail-safe such as boot interruption, map-out, and PPR are taken due to the occurrence of a memory fail in the BIOS, there is a possibility that the above-mentioned page offline technique will not be utilized.

SUMMARY

Aspects of the present invention provide a method for responding by the use of a page-offline technique of an operating system even when a memory fail occurs in a memory test process of a BIOS, and a computing device for performing the method.

Aspects of the present invention also provide a method for taking appropriate responding actions to a memory fail depending on the type of memory fail, and a computing device for performing the method.

Aspects of the present invention also provide a method for taking responding action on a failure of a page offline and a computing device for performing the method, when a page offline of an operating system was attempted as an appropriate responding action to the memory fail as a memory fail occurs in a memory test process of a BIOS, but failed.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present disclosure, a method of operating a computing device includes performing a pre-boot memory test on a memory by a BIOS (Basic Input/Output System), recording, in a log, memory fail information generated as a result of performing the pre-boot memory test by the BIOS, and performing a page offline operation using the memory fail information, after an operating system (OS) of the computing device is installed.

According to an aspect of the present disclosure, a method of operating an operating system (OS) installed in a computing device includes reading memory fail information which is recorded by a BIOS and generated as a result of performing a pre-boot memory test of the BIOS, and performing a page offline operation using the memory fail information.

According to an aspect of the present disclosure, a computing device includes a BIOS ROM configured to store a BIOS program configured to record memory fail information generated as a result of performing a pre-boot memory test on a memory, and load a boot image of an operating system and at least one auto-execution instruction, and a processor configured to execute the operating system and the at least one auto-execution instruction. The at least one auto-execution instruction includes an instruction for reading memory fail information after the loading of the boot image of the operating system, and recording at least some of the memory fail information in page offline information file referenced by a page offline module of the operating system. The operating system includes an instruction for performing a page offline operation using the at least some of the memory fail information of the page offline information file.

BRIEF DESCRIPTION OF THE DRAWINGS

The above and other aspects and features of the present invention will become more apparent by describing in detail exemplary embodiments thereof with reference to the attached drawings, in which:

FIG. 3 is a diagram for explaining a page offline information file referred to in some embodiments of the present disclosure;

FIG. 4 is a diagram for explaining a data schema of log referenced in some embodiments of the present disclosure;

FIGS. 6 to 8 are signal flow diagrams for aiding in understanding the method for responding to memory fail according to some embodiments of the present disclosure.

DETAILED DESCRIPTION OF THE EMBODIMENTS

Figure 1:
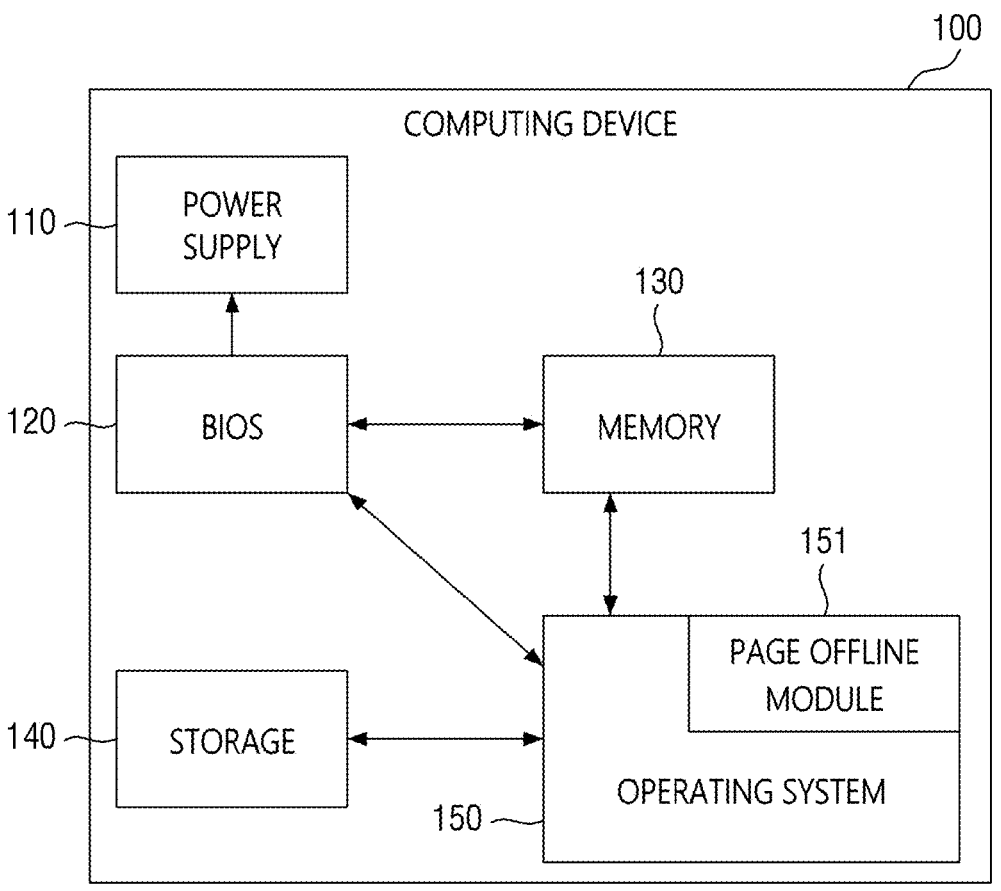
FIG. 1 is a block diagram of a computing device according to some embodiments of the present disclosure.

Hereinafter, example embodiments of the present disclosure will be described with reference to the attached drawings. The advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents. In describing the present disclosure, if it is determined that a detailed description of a related known configuration or function may obscure the gist of the present invention, the detailed description will be omitted.

The singular expressions used in the following embodiments include plural concepts, unless the context clearly specifies singularity. Additionally, plural expressions include singular concepts, unless the context clearly specifies plurality. In addition, terms such as first, second, A, B, (a), (b) used in the following embodiments are only used to distinguish one element from another element, and the terms do not limit the nature, sequence, or order of the relevant elements.

The elements described with reference to terms such as unit, module, block, ~or, ~er, etc. used in the present disclosure and the functional blocks shown in the drawings may be implemented in the form of software, hardware, or a combination thereof. For example, the software may be machine code, firmware, embedded code, and application software. For example, the hardware may include an electrical circuit, an electronic circuit, a processor, a computer, an integrated circuit, integrated circuit cores, passive components, or a combination thereof.

A configuration and operation of a computing device according to some embodiments of the present disclosure will be described below with reference to FIG. 1.

Figure 9:
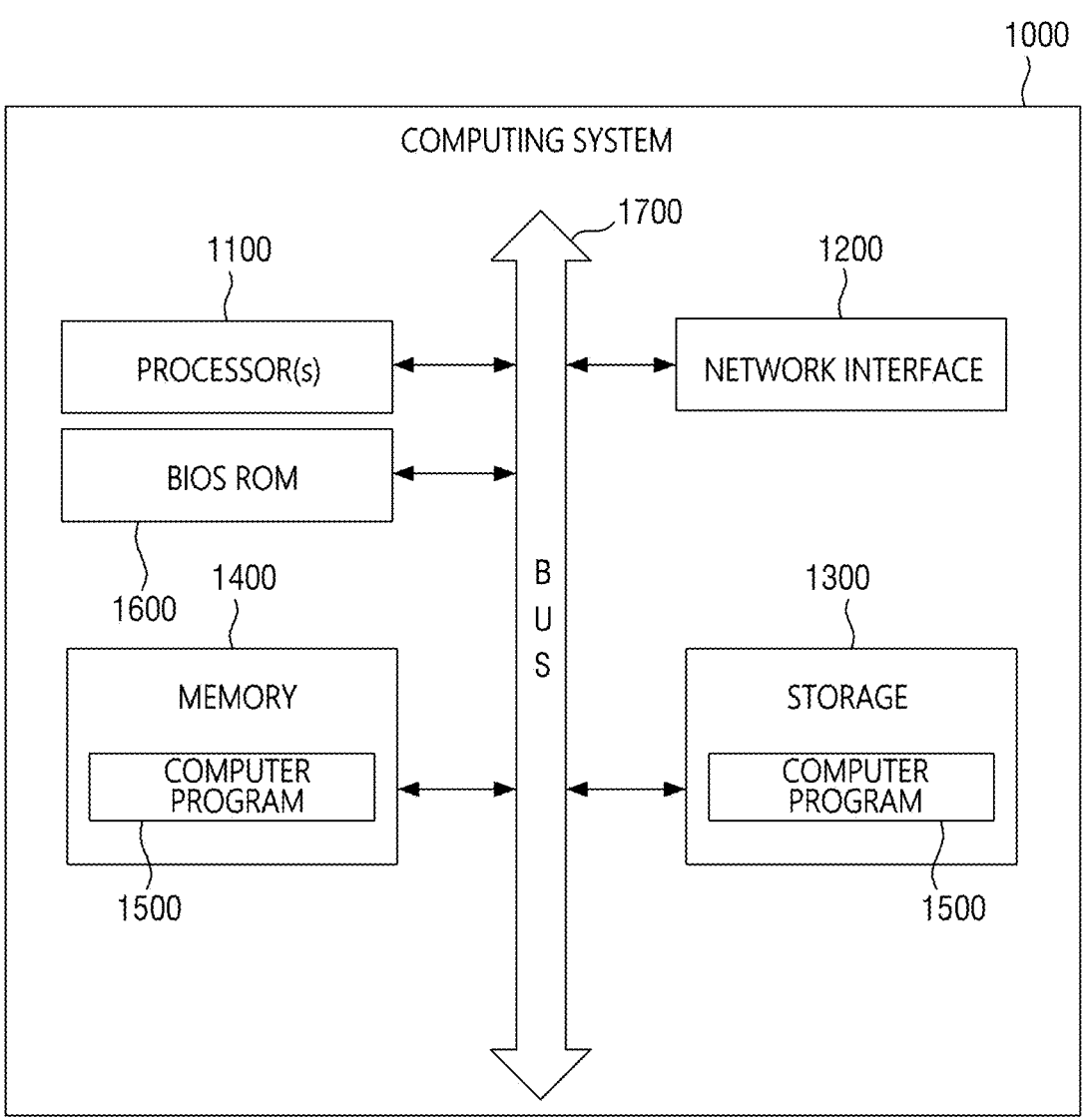
FIG. 9 is a hardware configuration diagram of a computing system according to some embodiments of the present disclosure.

As shown in FIG. 1, a computing device 100 according to some embodiments may include a BIOS 120, a memory 130, and an operating system 150. It will be appreciated that the configuration diagram of the computing device 100 shown in FIG. 1 is shown in units of logical elements rather than actual hardware elements. The hardware configuration of the computing device 100 may be understood by description referring to FIG. 9, which will be described below. For example, FIG. 1 shows functional blocks in the computing device 100 as shown in FIG. 9.

When a power is applied to the computing device 100, a BIOS program stored in a ROM (Read Only Memory) is executed. Thus, the operating BIOS 120 performs self-tests on various hardware elements, such as the memory 130. Such a self-test is performed before booting the operating system 150. The present disclosure relates to a situation in which a memory fail occurs as a result of testing on the memory 130 among various hardware elements.

The BIOS 120 records information about a memory failure in a log. Since the memory test is performed by the BIOS 120 before the operating system 150 boots up as described above, the log may not be recorded as a file. This is because the operating system 150 may be written to the storage 140 only when it has completed mounting on the file system. Therefore, the BIOS 120 may record the log in a predetermined format in a predetermined address region of the memory 130, or record it in a CMOS (Complementary Metal-Oxide Semiconductor) memory that stores the BIOS configuration values (i.e., the CMOS setup).

The BIOS 120 may determine a responding action depending on the type of memory fail. For example, if the type of memory fail is included in one or more predetermined fatal types, the BIOS 120 may perform any one of the legacy responding actions. The one or more predetermined fatal types may include several predetermined memory fail types that cannot be overcome by executing the page offline. The one or more predetermined fatal types may include memory fail types related to processing failure of the control signal. The legacy responding actions may include booting interruption, channel map-out, PPR, and rebooting. The BIOS 120 may control one or more hardware elements, such as a power supply 110, during performance of the legacy responding actions.

If the type of the memory fail is not included in the fatal type, the BIOS 120 may record the memory fail information in the log, and may initiate booting using the operating system 150 by executing the bootloader. The format of the memory fail information will be described below with reference to FIG. 4.

The operating system 150 may be loaded into the memory 130, and execute various initialization instructions for booting the computing device 100. The initialization instructions may include a BIOS linkage instruction that reads memory fail information and writes at least some of the memory fail information to a page offline information file referenced by the page offline module. The page offline information file may be accessed through a file system structure configured on the storage 140 by the operating system 150.

That is, the memory fail information included in the log recorded by the BIOS is recorded in the page offline information file by a BIOS test information linkage module (not shown) that is implemented by executing the BIOS linkage instruction. That is, the BIOS test information linkage module plays a role of copying the memory fail information to a page offline information file that may be accessed by the operating system. Therefore, the BIOS test information linkage module may be executed after the mounting of the file system of the operating system 150 is completed, no matter how quick.

In some embodiments, the BIOS test information linkage module may be automatically executed at the time of booting by being included in a list of modules that are automatically executed at the time of booting. For example, the booting auto-execution script may include commands and parameters for executing the BIOS test information linkage module.

A page offline module 151 is a module of the operating system 150, and depending on its execution method, it may be executed at the same time as the booting of the operating system 150, or may be executed when a specific event occurs after booting. When the page offline module 151 is executed, the page offline may be performed by referring to a physical address of the memory fail region written in the page offline information file. Therefore, it would be desirable that the BIOS linkage instruction be executed at the latest before the page offline module 151 is executed. In some embodiments, the BIOS linkage instruction may be executed and completed before the page offline module 151 is executed.

In some embodiments, hooking may be performed on one or more APIs executed in the process of the execution of the page offline module 151 through an API hooking technique to ensure that the execution time of the BIOS linkage instruction is earlier than the execution time of the page offline module 151. For example, such hooking may ensure the completion of the BIOS linkage instruction before initiating execution of the page offline module 151. In a hooking callback function executed according to the hooking, it is verified whether the execution situation of the page offline module 151 is correct, and if the execution situation of the page offline module 151 is correct as a result of the verification, execution of the BIOS linkage instruction may be completed first. As a result, it is possible to ensure that the execution time of the BIOS linkage instruction is earlier than the execution time of the page offline module 151, and the memory fail region confirmed as a result of the memory test performed by the BIOS 120 may be reliably disabled by the page offline module 151.

In some embodiments, the BIOS linkage instructions may be implemented separately for each model of the BIOS 120, since the way of recording logs and the location at which the logs are stored may differ for each model of the BIOS 120. If the page offline module 151 performs the operations of the BIOS test information linkage module as described above, the page offline module 151 should be individually implemented for each model of the BIOS 120. Although such an implement way may result in hypertrophy of the page offline module 151, it will be appreciated that the BIOS linkage instructions are implemented separately from the page offline module 151, as discussed above.

Of course, it goes without saying that the page offline module 151 may perform the operations of the BIOS test information linkage module described above in some other embodiments. In this case, there is an implementation advantage that there is no need to mobilize a separate technique such as the above-mentioned hooking for ensuring that the execution time of the BIOS linkage instruction is earlier than the execution time of the page offline module 151.

The configuration and operation of the computing device according to some embodiments have been described above. The method for operating the computing device of the present disclosure may be understood in more detail by reference to some embodiments to be described below. Furthermore, the technical idea that may be understood through the above-described embodiments of the dynamic monitoring system may be reflected in various embodiments to be described below.

Figure 2:
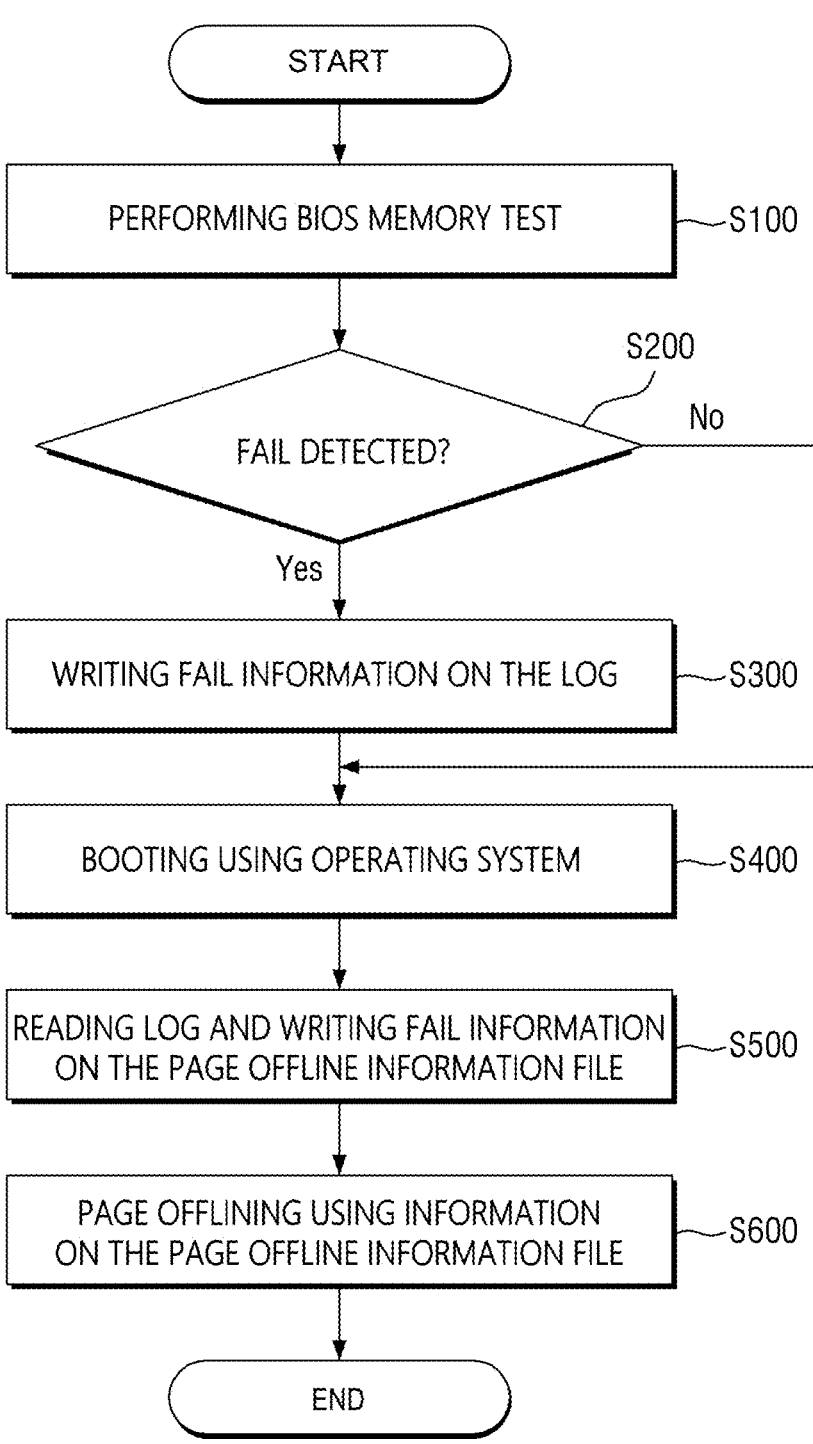
FIG. 2 is a flowchart of a method for responding to memory fail according to some embodiments of the present disclosure.

Hereinafter, a method for responding to memory fail according to some embodiments of the present disclosure will be described with reference to FIG. 2. A dynamic monitoring method according to some embodiments may be executed by a computing device. Hereinafter, when the execution entity of each operation is omitted, it may be understood that the execution entity is the above-mentioned computing device.

A memory test is performed by a BIOS (S100). When a memory fail is detected in the memory test (S200), memory fail information is recorded in a log (S300). The present disclosure is not limited thereto. In some embodiments, the BIOS may record the memory fail information of the memory fail in the log, when a type of the memory fail corresponds to one or more predetermined page offline linkage target types. For example, predetermined page offline linkage target types may include single bit type, transient error type, row type, area type. The row type may indicate adjacent cells with a constant x address and a changing y address fail continuously. The area type may indicate adjacent cells within an closed area fail continuously.

Figure 5:
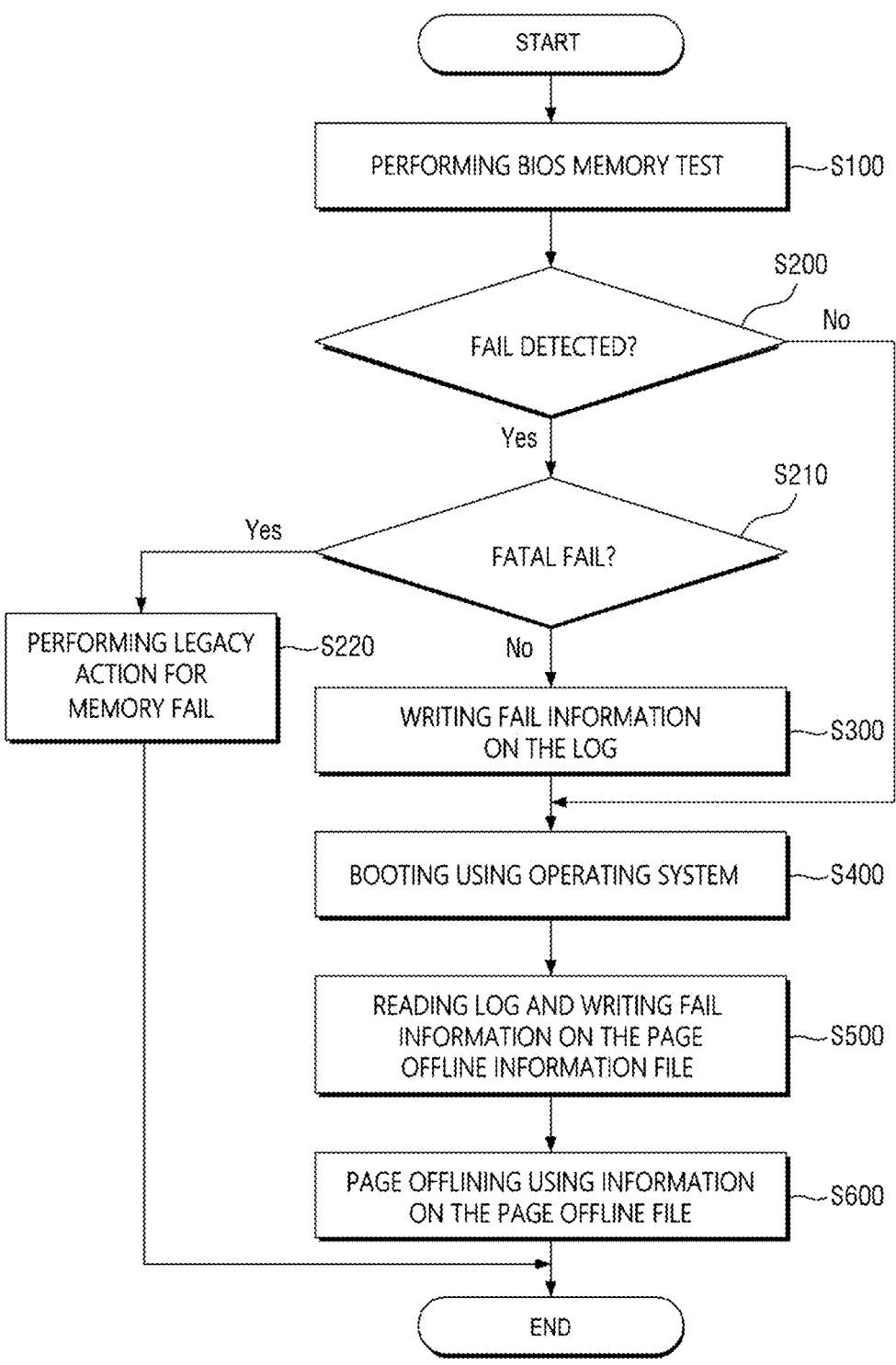
FIG. 5 is a flowchart for explaining some embodiments in which some operations of the method for responding to memory fail described with reference to FIG. 2 is modified.

For example, as shown in FIG. 5, if a memory fail is detected in the memory test (S200), it may be determined whether memory fail information is recorded in the log depending on the type of memory fail (S210). For example, if the type of the memory fail is a fatal type (S210), a legacy responding action may be performed without recording the memory fail information in the log (S220). Hereinafter, whether the type of the memory fail is a fatal type is referred to as a first condition of the step S210.

For example, only if the first condition is satisfied when a failure is detected in the memory test, a legacy responding action by the BIOS may be performed (S220), and otherwise, the recording the memory fail information may be recorded in the log (S300).

The legacy responding actions may include booting interruption, channel map-out, PPR, and rebooting, and determining of the execution target action among the legacy responding actions will be determined by the logic of the BIOS.

If the first condition is satisfied, it may be a case where the type of memory fail is included in one or more predetermined fatal types. In this case, by minimizing the execution of legacy responding actions, it is possible to maximize the use of the available resources of the memory module.

In some embodiments, the memory fail information may be recorded in the log (S300) only if a second condition is satisfied when a memory fail is detected in the memory test, and if the second condition is not satisfied, any one of the legacy responding actions may be performed (S220).

The second condition may be a condition that is satisfied when the data size corresponding to the address region in which the memory fail occurs is less than a reference value. That is, in this case, only when the data size of the region that cannot be utilized due to a memory fail is less than the standard value, the memory fail response is performed through page offline in a limited manner, thereby enhancing stability of the execution environment of the computing device.

In some embodiments, whether the legacy responding action by the BIOS is to be performed only if the first condition is satisfied when a failure is detected in the memory test, or whether the memory fail responding action is to be performed through the page offline only if the second condition is satisfied, may be configured in the BIOS through CMOS settings, and the like. This allows the user of the computing device to specify whether to give priority to the stability of the execution environment or to make maximum use of memory resources, depending on the purpose of the computing device.

In some embodiments, the memory fail information may include information on the physical address in which the memory fail occurred, and a bit indicating activation as the value of the page offline check flag. In some embodiments, the memory fail information may include a physical address of the memory fail and a first value of a page offline check flag indicating activation of the page offline operation. The physical address may correspond to a page address of a page having the memory fail. The activation of the page offline operation indicates that the physical address of the memory fail has not been subject to the page offline operation. The operating system may manage the memory in a unit of a page. In some embodiments, the pre-boot memory test may be performed in a unit of a page and generate memory fail information associated with a page address of a page having memory fail (i.e., a bad page). In some embodiments, the bad page associated with the first value of the page offline check flag may be removed from a memory space managed by the operating system after the page offline operation is completed.

The log may be recorded in a EWL (Enhanced Warning Log) structure of a BDAT (BIOS Data ACPI Table). The conventional EWL structure does not define an entry for writing the memory fail information. In view of that, in some embodiments, entries of the physical address information and entries 13 and 15 of the page offline check flag may be added to the EWL structures 12 and 14, as shown in FIG. 4. The log recorded in the EWL structure as shown in FIG. 4 may be recorded in a predetermined region of memory as described above, or may be recorded in the CMOS memory. Additionally, the operating system may access logs through the ACPI interface in a standardized way.

In some embodiments, the memory fail information may further include one or more additional entries. The one or more additional entries may be information that the page offline module of the operating system may reference to perform page offline in a way of corresponding to the memory test result of the BIOS.

For example, the additional entries may include at least one of type information of the memory fail, history information of the memory fail occurrence, memory test way information of BIOS, model and version information of BIOS, model information of the memory module, and model information of the memory controller.

After the memory fail information is recorded, booting using the operating system installed on the computing device is performed (i.e., the operating system is installed on the computing device) (S400), and after booting (i.e., after installing the operating system), the log is read, and at least some of the memory fail information recorded in the log are recorded in the page offline information file (S500). The page offline information file may be a file in which the physical address of a page to be page offline target by the page offline module is recorded. FIG. 3 shows a description (10, 11) on the page offline information file in a Linux operating system. Specifically, a description (10) about the page offline information file for soft page offline, which performs page offline after backing up the data of the page targeted for page offline, and a description (11) about the page offline information file of a hard page offline, which performs page offline without data backup, are shown in FIG. 3.

In some embodiments, in step S500, if the value of the page offline check flag included in the memory fail information is a value indicating activation (for example, TRUE), the physical address information included in the memory fail information may be recorded in the offline information file.

As described above, step S500 may be performed by the BIOS test information linkage module or may be performed by the page offline module. "After booting" might be interpreted as "after loading of a kernel of the operating system capable of executing applications or services of the user level into the memory, and mounting of the file system are completed."

Next, the page offline may be performed, using the physical address information recorded in the page offline information file in step S600. Through the page offline, the memory region corresponding to the physical address information will not be mapped to the memory page accessed by process executed on the operating system. Accordingly, the stability of the memory access of the process will be enhanced.

In some embodiments, a soft page offline may be performed first through step S600, and a hard page offline may be performed when the soft page offline fails.

Figure 8:
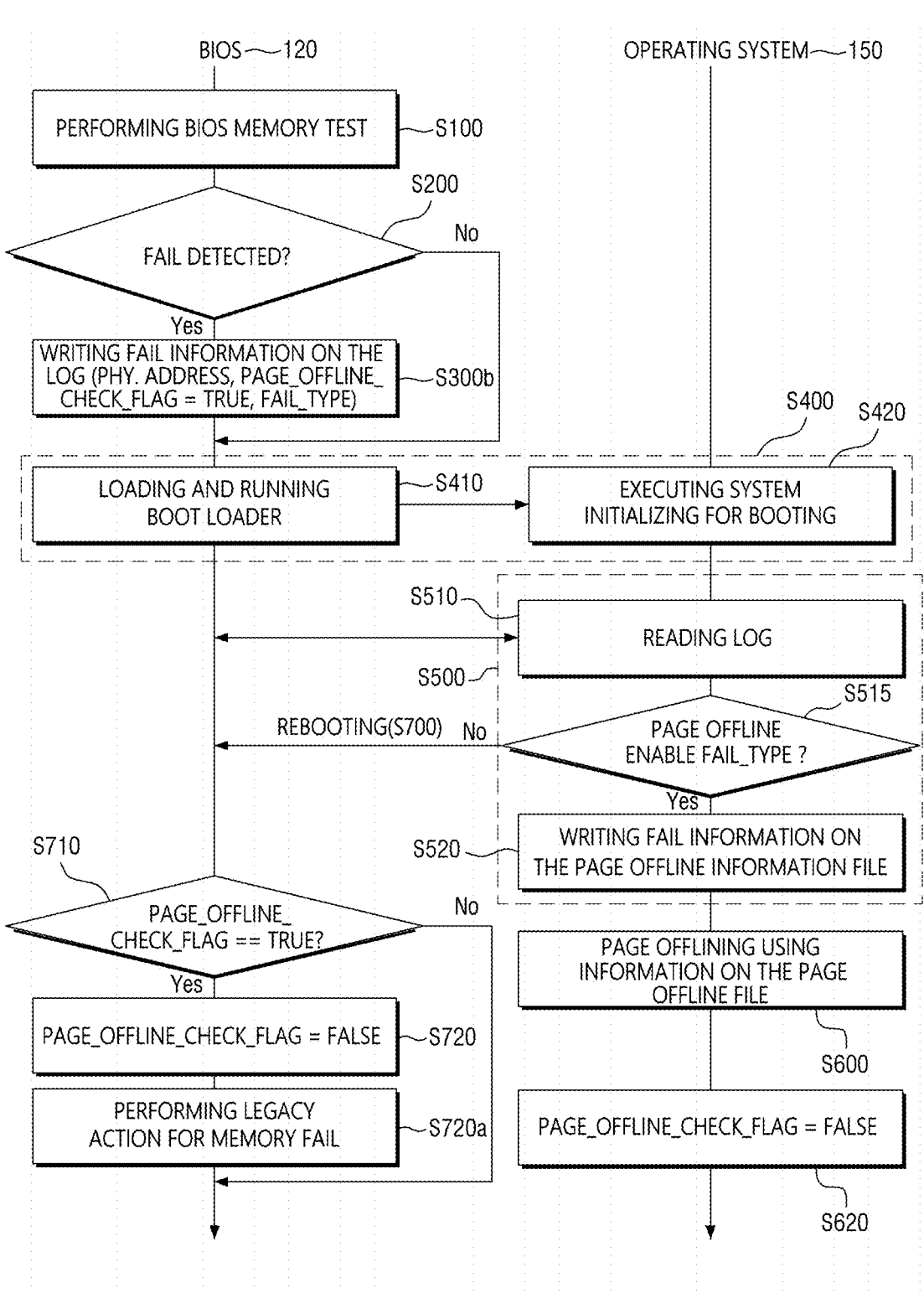

The explanation will be made below with reference to FIGS. 6 to 8 to facilitate understanding of some embodiments.

Figure 6:
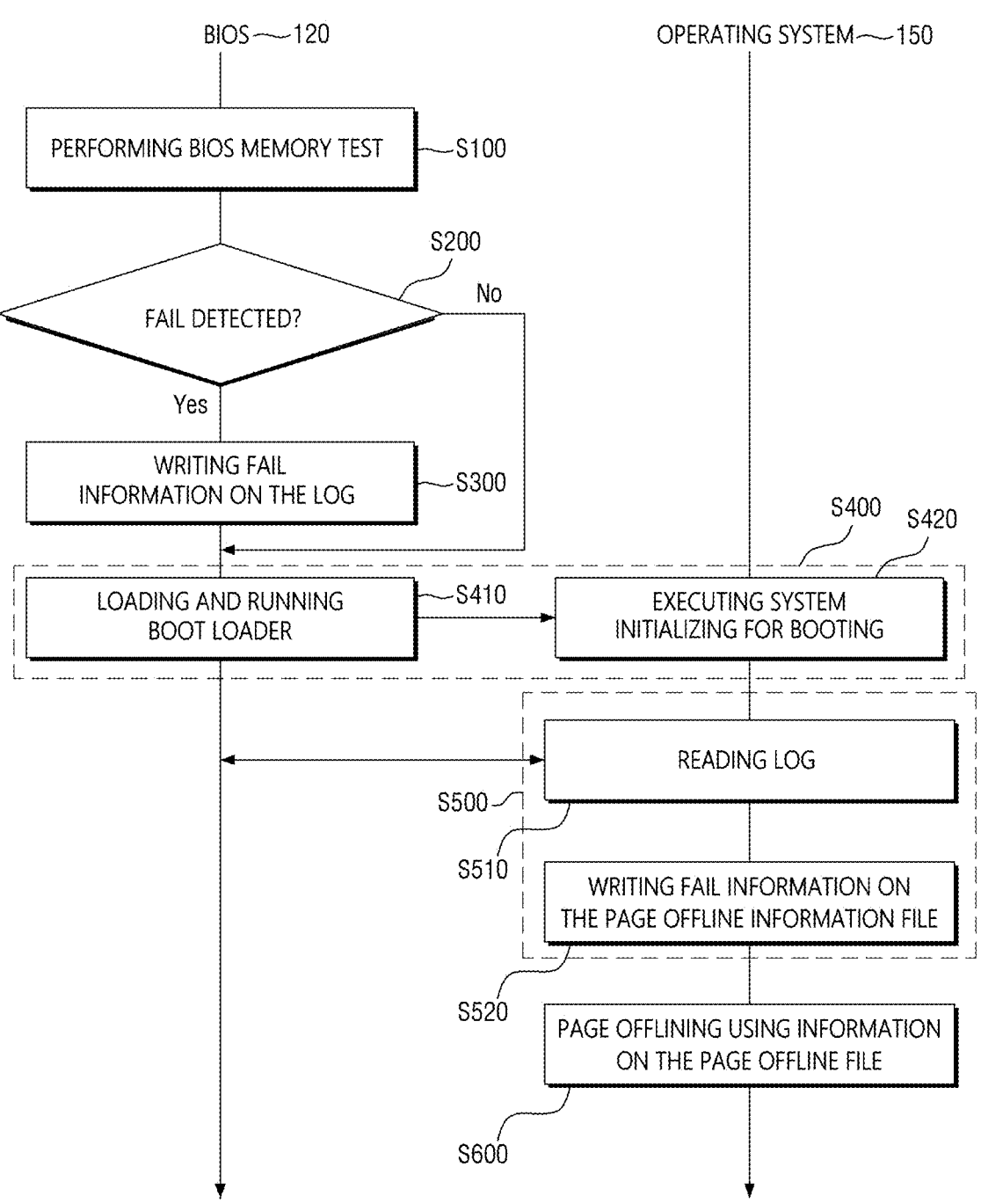

FIG. 6 is a signal flowchart to more clearly understand an interaction between the BIOS 120 and the operating system 150.

When a power is applied to the computing device, the BIOS 120 included in the computing device performs a self-memory test (S100). When a memory fail is detected as a result of the memory test (S200), the BIOS 120 records the memory fail information in a log (S300). The BIOS 120 loads and executes the boot loader (S410), and the operating system 150 executes instructions for system initialization to cause the computing device to boot up (S420). After booting the computing device, the BIOS 120 does not operate any longer.

The operating system 150 reads the log (S510). We have already mentioned that logs may be read from the CMOS memory or a specific address of the memory.

The operating system 150 records the memory fail information included in the log in the page offline information file (S520). Recording of the memory fail information in the page offline information file may be performed by a BIOS test information linkage module executed by the operating system is booted up, or may be performed by the page offline module itself.

Next, the operating system 150 executes the page offline, using the information recorded in the page offline information file (S600).

In some embodiments, if the page offline by the operating system 150 fails, legacy responding actions by the BIOS 120 may be performed as a second-best solution. FIG. 7 shows some embodiments for preventing the BIOS 120 from continuously attempting to take a page offline by the operating system 150, even though the page offline by the operating system 150 has failed.

When a memory fail is detected (S200) as a result of executing the self-memory test (S100), the BIOS 120 may record physical address information in which the memory fail occurred, and a memory fail information that includes a bit indicating activation as the value of the page offline check flag, in the log (S300).

The operating system 150 may attempt offline processing (i.e., the page offline or the bad page offline) of the page corresponding to the physical address information via the process described with reference to FIG. 6 (S600). If the page offline is successful (S610), the operating system 150 may update the value of the page offline check flag recorded in the log to a bit indicating deactivation (S620). In some embodiments, the page offline check flag may be updated to a second value indicating deactivation of the page offline operation, after the page offline operation is completed (i.e., successfully completed). The deactivation of the page offline operation indicates that the physical address of the bad page having a memory fail has been subject to the offline operation, thereby the physical address of the bad page being removed from a memory space managed by the OS. The entity that updates the value of the page offline check flag may be the BIOS test information linkage module or the page offline module.

If the page offline fails (S610), the operating system 150 reboots up the computing device (S700). In the rebooting of the computing device, the value of the page offline check flag may still be set to the bit indicating the activation (i.e., may be maintained as the bit indicating the activation).

By rebooting (S700), the BIOS 120 will execute a memory test (not shown) again, and unless there are special circumstances, a memory fail will be detected as before (not shown). At this time, the BIOS 120 checks whether the value of the page offline check flag is a bit indicating the activation (S710).

If the reboot occurred in accordance with the failure of the page offline, since the value of the page offline check flag is still set to the bit indicating the activation, the BIOS 120 may indirectly check whether the page offline has already been attempted and failed as a memory fail responding action, by checking whether the value of the page offline check flag is a bit indicating the activation.

If the value of the page offline check flag is a bit indicating activation (S710), the BIOS 120 updates the value of the page offline check flag to a bit indicating the deactivation (S720), and may perform a legacy responding action (S720a).

On the other hand, in some embodiments, even if the BIOS 120 determines a page offline as the memory fail responding action, records the memory fail information in the log, and boots up the operating system, the operating system may determine whether to perform the page offline by itself. This will be explained with reference to FIG. 8.

When a memory fail is detected (S200) as a result of performing the self-memory test (S100), the BIOS 120 may record physical address information in which the memory fail occurred, a bit indicating activation as the value of the page offline check flag, and memory fail information including one or more additional entries, in the log (S300b).

For example, the additional entries may include at least one of type information of the memory fail, history information of the memory fail occurrence, memory test way information of BIOS, model and version information of BIOS, model information of the memory module, and model information of the memory controller.

The type information of the memory fail may include at least some of a single-bit type, a multiple single-bit type, and a low-fail type.

For ease of understanding, the following description assumes a situation in which type information of the memory fail is recorded as the additional entries.

After reading the log (S510), the operating system 150 may determine whether the type of memory fail is a type in which the page offline is enabled, by the use of the type information of the memory fail recorded in the log (S515).

The page offline is a technique that depends on the operating system 150, and in some embodiments, the page offline module itself, rather than the BIOS test information linkage module, may determine whether the type of memory fail is a type in which the page offline is enabled (S515). For example, a list of types of memory fail in which the page offline is enabled is stored in advance, and the page offline module may refer to the list to determine whether the type of memory fail is a type in which the page offline is enabled.

If the type of memory fail is a type in which the page offline is enabled, as described above, the operating system 150 records the physical information in which the memory fail occurs in the page offline information file (S520), performs page offline (S600), and will update the value of the page offline check flag to a value indicating deactivation after performing the page offline (S620).

If the type of memory fail is not a type in which the page offline is enabled, the operating system may reboot the computing device (S700).

According to the re-booting (S700), the BIOS 120 checks whether the value of the page offline check flag is a bit indicating activation (S710), updates the value of the page offline check flag to a bit indicating deactivation (S720), when the value of the page offline check flag is a bit indicating activation, and may perform the legacy responding action (S720a).

Technical ideas that may be understood through some embodiments described above with reference to FIGS. 1 to 8 may be reflected in other embodiments described below.

FIG. 9 is a hardware configuration diagram of a computing system 1000 according to some embodiments of the present disclosure. The computing system 1000 of FIG. 9 may, for example, refer to the computing device 100 described with reference to FIG. 1. The computing system 1000 may include one or more processors 1100, a system bus 1700, a BIOS ROM 1600 that stores a BIOS program, a communication interface 1200, a memory 1400 that loads the computer program 1500 executed by the processor 1100, and a storage 1300 that stores the computer program 1500. The computing system 1000 may be provisioned through a cloud service, and in this case, one or more processors 1100, communication interface 1200, memory 1400, and storage 1300 may all be virtual resources.

The BIOS program may record the memory fail information generated as a result of performing a pre-boot memory test. That is, the BIOS program records the memory fail information in the log and then successfully perform booting using the operating system, rather than performing the legacy responding action because a memory fail is detected as a result of executing a memory test. The log is written to a EWL structure of BDAT (BIOS Data ACPI Table) and may be recorded at a specific address of a CMOS memory (not shown) or a memory 1400.

In some embodiments, the BIOS program may include instructions that perform the legacy responding action when the type of the memory fail is a fatal type, and records the memory fail information in the log and then normally performs booing using the operating system, if the type of the memory fail is not a fatal type.

The processor 1100 controls the overall operation of each component of the computing system 1000. The processor 1100 may perform calculation on at least one application or program for performing methods/operations according to various embodiments of the present disclosure. The memory 1400 stores various types of data, instructions and/or information. The memory 1400 may load one or more computer programs 1500 from the storage 1300 to perform methods/operations according to various embodiments of the present disclosure. The system bus 1700 provides communication functionality between components of the computing system 1000. The communication interface 1200 supports Internet communications for the computing system 1000. The storage 1300 may non-temporarily store one or more computer programs 1500.

The computer program 1500 may include one or more instructions that implement methods/operations according to various embodiments of the present disclosure. When the computer program 1500 is loaded into the memory 1400, the processor 1100 may perform methods/operations according to various embodiments of the present disclosure by executing one or more instructions.

The computer program 1500 may include a plurality of instructions that make up the operating system, and one or more auto-execute instructions that are automatically executed when the operating system boots up.

The one or more auto-execute instructions may include instructions for reading the memory fail information after booting up the operating system and recording at least some of the memory fail information to a page offline information file referenced by the page offline module. Further, the operating system may include instructions for performing the page offline, using information written in the page offline information file.

Various embodiments of the present disclosure and the effects thereof have been described with reference to FIGS. 1 to 9. The effects according to the technical idea of the present disclosure are not limited to the effects mentioned above, and other effects not described can be clearly understood by those skilled in the art from the description above.

The technical ideas of the present disclosure described so far can be implemented as computer-readable code on a computer-readable medium. The computer program recorded on the computer-readable recording medium can be transmitted to another computing device through a network such as the Internet, installed on the other computing device, and thus used on the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. Although some embodiments of the present disclosure have been described above with reference to the attached drawings, those skilled in the art will understand that the present disclosure may be implemented in other specific forms without changing the technical idea or essential features. The embodiments described above should be understood in all respects as illustrative and not restrictive. The scope of protection of the present invention should be interpreted in accordance with the claims below, and all technical ideas within the equivalent scope should be construed as being included in the scope of rights of the technical ideas defined by this disclosure.

What is claimed is:

1. A method of operating a computing device comprising:
recording, in a log, memory fail information generated as a result of performing a pre-boot memory test by a BIOS; and
performing a page offline operation using the memory fail information, after booting up of an operating system (OS) of the computing device.

2. The method of claim 1,
wherein recording the memory fail information in the log includes:
recording the memory fail information in the log, when a type of a memory fail corresponding to the memory fail information is included in at least one predetermined page offline linkage target type.

3. The method of claim 1,
wherein the memory fail information includes a physical address of a memory fail and a first value of a page offline check flag indicating activation of the page offline operation,
wherein the physical address corresponds to a page address of a page having the memory fail, and
wherein the activation of the page offline operation indicates that the physical address of the memory fail has not been subject to the page offline operation.

4. The method of claim 3,
wherein the log is recorded in an EWL (Enhanced Warning Log) structure of a BDAT (BIOS Data ACPI Table).

5. The method of claim 3,
wherein performing the page offline operation includes:
updating the page offline check flag to a second value indicating deactivation of the page offline operation, after the page offline operation is completed, and
wherein the deactivation of the page offline operation indicates that the physical address has been subject to the page offline operation, thereby the physical address being removed from a memory space managed by the OS.

6. The method of claim 5, further comprising:
performing rebooting, in response to the page offline operation failing, the computing device, while maintaining the first value of the page offline check flag,
updating the first value of the page offline check flag to the second value thereof, and performing a legacy responding action after the updating of the first value of the page offline check flag to the second value.

7. The method of claim 1,
wherein executing the page offline operation includes:
reading the memory fail information recorded in the log;
recording at least some of the memory fail information in a page offline information file referenced by a page offline module of the OS; and
performing the page offline operation using the at least some of the memory fail information recorded in the page offline information file.

8. The method of claim 7,
wherein the reading of the memory fail information and the recording of the at least some of the memory fail information are performed after a file system of the OS is mounted, and before executing of the page offline module is started.

9. The method of claim 7,
wherein the reading of the memory fail information and the recording of the at least some of the memory fail information are performed by a BIOS test information linkage module that is executed after the OS is booted up.

10. The method of claim 7,
wherein the reading of the memory fail information and the recording of the at least some of the memory fail information are performed by the page offline module of the OS.

11. The method of claim 7,
wherein the recording of the at least some of the memory fail information includes:
recording a physical address of a memory fail, and
wherein the physical address corresponds to a page address which is a unit of a memory management by the OS.

12. The method of claim 7,
wherein the memory fail information includes a physical address of the memory fail, a bit indicating activation as a value of a page offline check flag, and information indicating a memory fail type,
wherein the physical address corresponds to a page address which is a unit of a memory management by the OS, and
wherein the recording of the at least some of the memory fail information in the page offline information file referenced by the page offline module includes:
recording the at least some of the memory fail information in the page offline information file, when the memory fail type is included in at least one predetermined page offline execution target type.

13. The method of claim 12, wherein the recording of the at least some of the memory fail information in the page offline information file referenced by the page offline module includes:

performing rebooting, when the memory fail type is not included in the at least one predetermined page offline execution target type.

14. A method of operating an operating system (OS) installed in a computing device comprising:

reading memory fail information which is recorded by a BIOS and generated as a result of performing a pre-boot memory test of the BIOS; and performing a page offline operation using the memory fail information.

15. The method of claim 14, wherein performing the page offline operation includes:

recording at least some of the memory fail information in a page offline information file referenced by executing a page offline module of the OS; and performing the page offline operation using the at least some of the memory fail information recorded in the page offline information file.

16. The method of claim 15, wherein recording at least some of the memory fail information in the page offline information file is performed after a file system of the OS is mounted, and before executing of the page offline module is started.

17. The method of claim 15, wherein the recording of the at least some of the memory fail information in the page offline information file is performed by a BIOS test information linkage module that is installed in the operating system and executed after the operating system is booted up.

18. The method of claim 14, wherein the memory fail information includes a physical address of a memory fail detected by the pre-boot memory test, and a first value of a page offline check flag indicating activation of the page offline operation, wherein the physical address corresponds to a page address which is a unit of a memory management by the OS, and wherein the activation of the page offline operation indicates that the physical address of the memory fail has not been subject to the page offline operation.

19. The method of claim 18, wherein performing the page offline operation includes:

after the page offline operation is successfully performed, updating the first value of the page offline check flag to a second value of the page offline check flag indicating deactivation of the page offline operation; and when the page offline operation fails, performing rebooting, while maintaining the first value of the page offline check flag, wherein the activation of the page offline operation indicates that the physical address of the memory fail has not been subject to the page offline operation, and wherein the deactivation of the page offline operation indicates that the physical address of the memory fail has been subject to the page offline operation.

20. A computing device comprising:

a BIOS ROM configured to store a BIOS program configured to:

record memory fail information generated as a result of performing a pre-boot memory test on a memory, and load a boot image of an operating system and at least one auto-execution instruction; and a processor configured to execute the operating system and the at least one auto-execution instruction, wherein the at least one auto-execution instruction includes:

an instruction for reading memory fail information after the loading of the boot image of the operating system, and recording at least some of the memory fail information in page offline information file referenced by a page offline module of the operating system, and wherein the operating system includes an instruction for performing a page offline operation using the at least some of the memory fail information of the page offline information file.

* * * * *